United States Patent
Baer et al.

(10) Patent No.: US 7,603,762 B2
(45) Date of Patent: Oct. 20, 2009

(54) OPTICAL LAPPING GUIDE FOR USE IN THE MANUFACTURE OF PERPENDICULAR MAGNETIC WRITE HEADS

(75) Inventors: Amanda Baer, Campbell, CA (US); Vladimir Nikitin, Campbell, CA (US); Aron Pentek, San Jose, CA (US); Neil Leslie Robertson, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 356 days.

(21) Appl. No.: 11/611,829

(22) Filed: Dec. 15, 2006

(65) Prior Publication Data
US 2008/0141522 A1      Jun. 19, 2008

(51) Int. Cl.
B24B 49/00    (2006.01)
B24B 49/10    (2006.01)

(52) U.S. Cl. .............................. 29/603.12; 29/603.072; 29/603.15; 29/603.16; 29/603.18; 451/6

(58) Field of Classification Search .............. 29/603.12, 29/603.15, 603.16, 603.18; 451/6, 5, 8, 11
See application file for complete search history.

(56) References Cited

U.S. PATENT DOCUMENTS

| | | | |
|---|---|---|---|
| 4,841,625 A | 6/1989 | Valstyn | 29/603 |
| 5,772,493 A | 6/1998 | Rottmayer et al. | 451/5 |
| 5,876,264 A | 3/1999 | Church et al. | 451/5 |
| 6,475,062 B1 | 11/2002 | Kubota et al. | 451/5 |
| 6,757,964 B2 | 7/2004 | Sasaki et al. | 29/737 |
| 6,884,148 B1 | 4/2005 | Dovek et al. | 451/5 |

*Primary Examiner*—Derris H Banks
*Assistant Examiner*—Dan D Le
(74) *Attorney, Agent, or Firm*—Zilka-Kotab, PC

(57) ABSTRACT

An optical lapping guide for determining an amount of lapping performed on a row of sliders in a process for manufacturing sliders for magnetic data recording. The optical lapping guide is constructed with a front edge that is at an angle with respect to an air bearing surface plane ABS plane, such that a portion of the lapping guides is in front of the ABS and portion of the lapping guide is behind the ABS. As lapping progresses, an increasing amount of the lapping guide will be exposed at the ABS and visible for inspection. Therefore, after a lapping process has been performed, the optical lapping guide can be inspected to determine the amount of material removed by lapping. The greater the amount of the lapping guide that is exposed and visible, the greater the amount of material removed by lapping.

9 Claims, 12 Drawing Sheets

OPTICAL LAPPING GUIDE FOR USE IN THE MANUFACTURE OF PERPENDICULAR MAGNETIC WRITE HEADS

FIELD OF THE INVENTION

The present invention relates to the construction of the perpendicular magnetic write heads and more particularly to the use of an optical lapping guide for accurately defining write pole flare point of a perpendicular magnetic write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally has included a coil layer embedded in one or more insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In current read head designs a spin valve sensor, also referred to as a giant magnetoresistive (GMR) sensor, is employed for sensing magnetic fields from the rotating magnetic disk. The sensor includes a nonmagnetic conductive layer, hereinafter referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer. The thickness of the spacer layer is chosen to be less than the mean free path of conduction electrons through the sensor. With this arrangement, a portion of the conduction electrons is scattered by the interfaces of the spacer layer with each of the pinned and free layers.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Recently, researchers have focused on the development of perpendicular magnetic recording systems in order to increase the data density of a recording system. Such perpendicular recording systems record magnetic bits of data in a direction that is perpendicular to the surface of the magnetic medium. A write head used in such a system generally includes a write pole having a relatively small cross section at the air bearing surface (ABS) and a return pole having a larger cross section at the ABS. A magnetic write coil induces a magnetic flux to be emitted from the write pole in a direction generally perpendicular to the plane of the magnetic medium. This flux returns to the write head at the return pole where it is sufficiently spread out and weak that it does not erase the signal written by the write pole.

The write pole typically has a flare point that is recessed a desired distance from the ABS. In addition, such a perpendicular magnetic write head may include a trailing shield that increases field gradient by canting the write field somewhat. The trailing magnetic shield has a throat height that is its thickness as measured from the ABS. Both the location of the write pole flare point and as well as the trailing shield throat height are critical dimensions that should be tightly controlled to ensure optimal magnetic performance. Maintaining these critical dimensions, however, becomes increasingly difficult to achieve as the size of such magnetic write heads becomes ever smaller.

Magnetic write heads are constructed upon a wafer, with thousands of such write heads being constructed on a single wafer. To form a slider, a wafer is cut into rows of sliders, and then this row of sliders is lapped to form an air bearing surface (ABS). This lapping determines critical dimensions such as the throat height of the trailing shield and the flare location of the yoke. Unfortunately, lapping processes are difficult to control, especially at the accuracy needed for very small write heads. This makes it difficult to control the trailing shield throat height and the write pole flare location. Therefore, there is a strong felt need for a process that can allow tight control of critical dimensions such as trailing shield throat height and write pole flare location.

SUMMARY OF THE INVENTION

The present invention provides an optical lapping guide for determining an amount of material removed by a lapping process during the construction of a slider for magnetic data recording. The optical lapping guide can be built into the slider, the optical lapping guide having a front edge that has a portion disposed in front of the air bearing surface plane (ABS plane) and a portion that is disposed behind the ABS plane.

The optical lapping guide can be configured such that the front edge of the lapping guide forms a shallow acute angle with respect to the ABS plane. As material is removed by lapping, a greater and greater portion of the lapping guide will be exposed and visible at the ABS. By measuring the amount of lapping guide visible at the ABS an operator can determine the amount of material that has been removed by lapping.

The optical lapping guide can be formed in the same photolithographic process step used to define a write pole of a write head on the slider. In this way, the lapping guide can be very accurately aligned with the write pole and can accurately determine the location of a flare point on the wire pole relative to the ABS.

A similar optical lapping guide can also be used to determine the throat height of a trailing shield on the write head. In that case, the lapping guide can be constructed in the same photolithographic process step used to define the trailing shield so that the lapping guide can very accurately determine the throat height of the lapping guide, as defined by the lapping operation.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
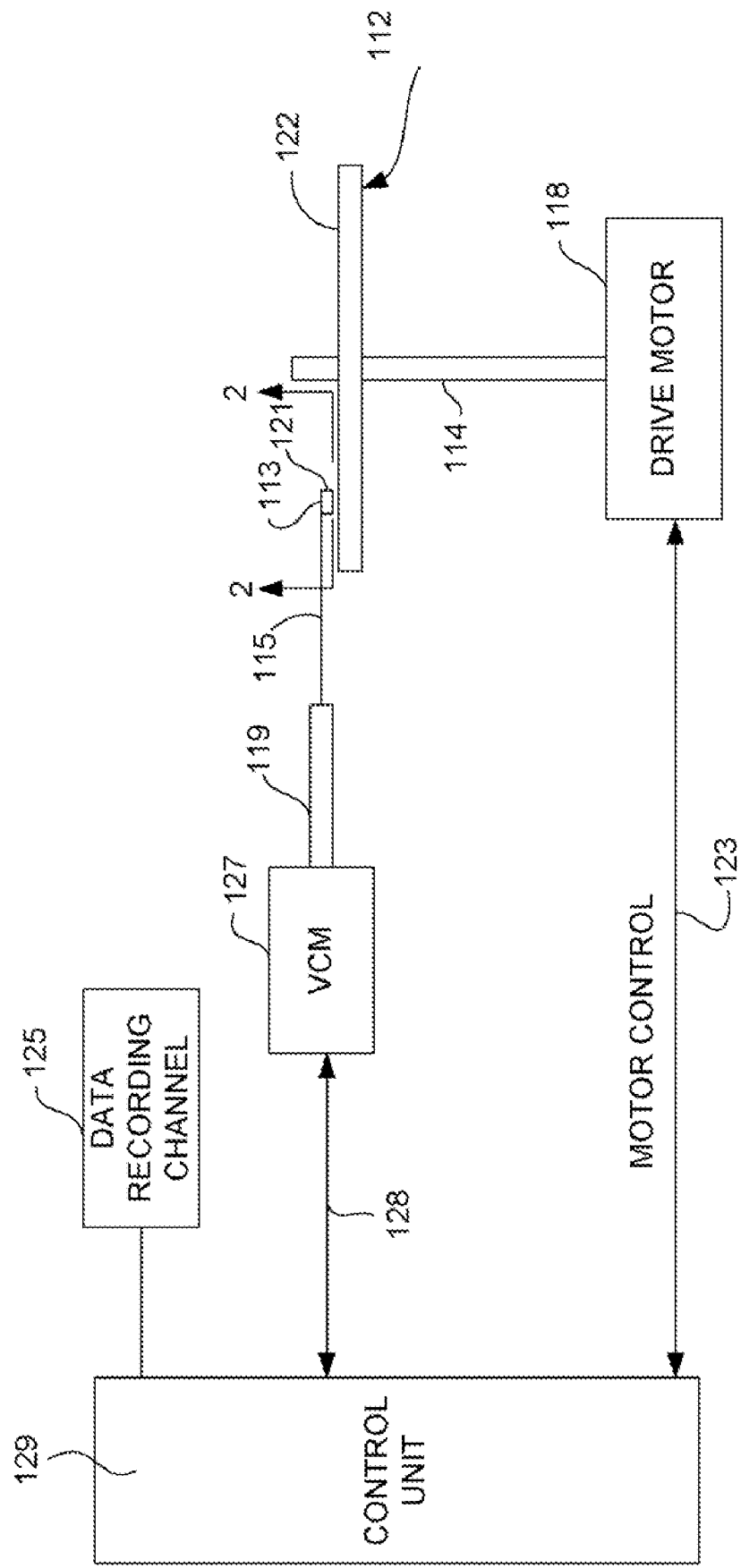
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
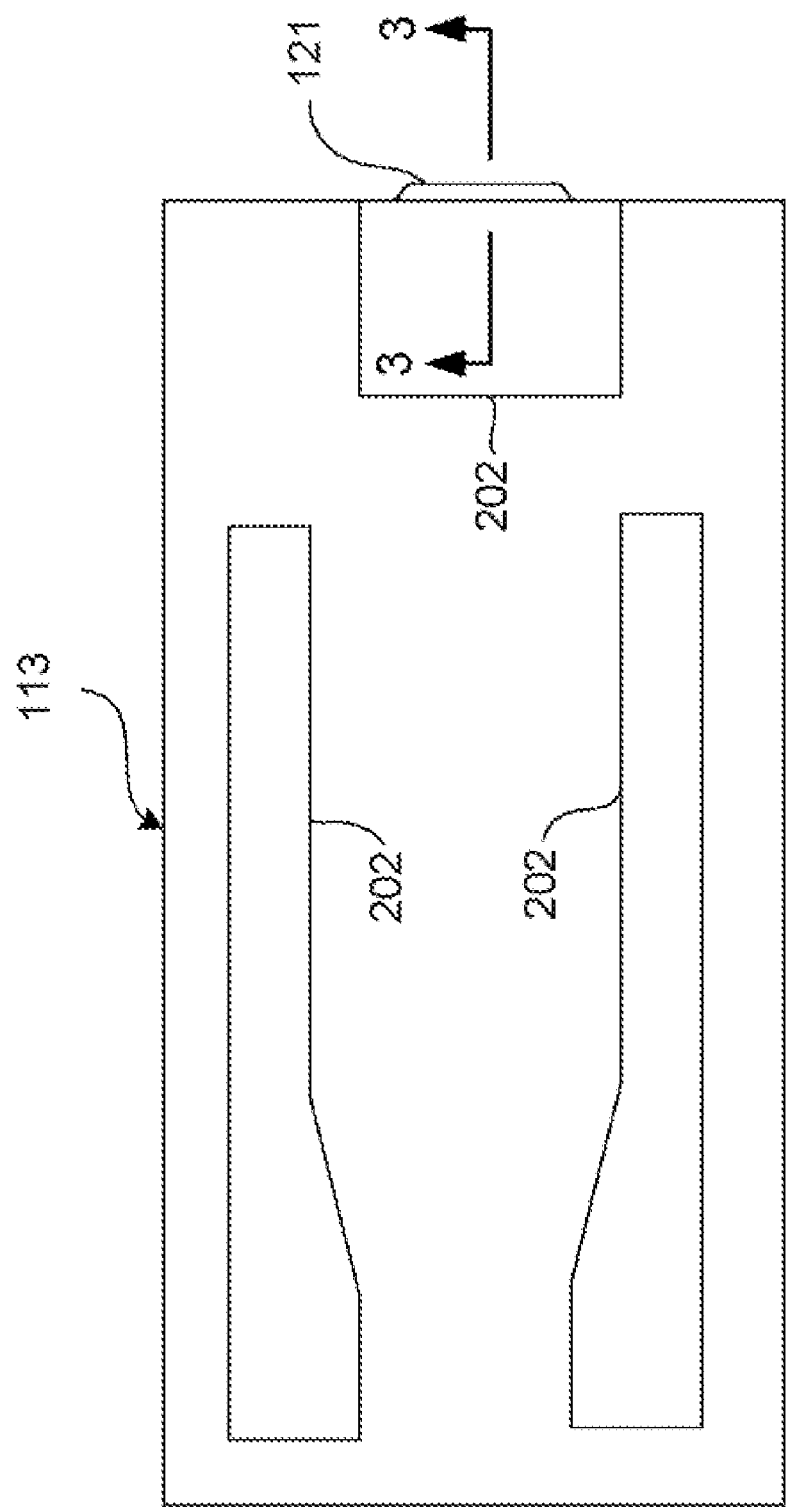
FIG. 2 is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
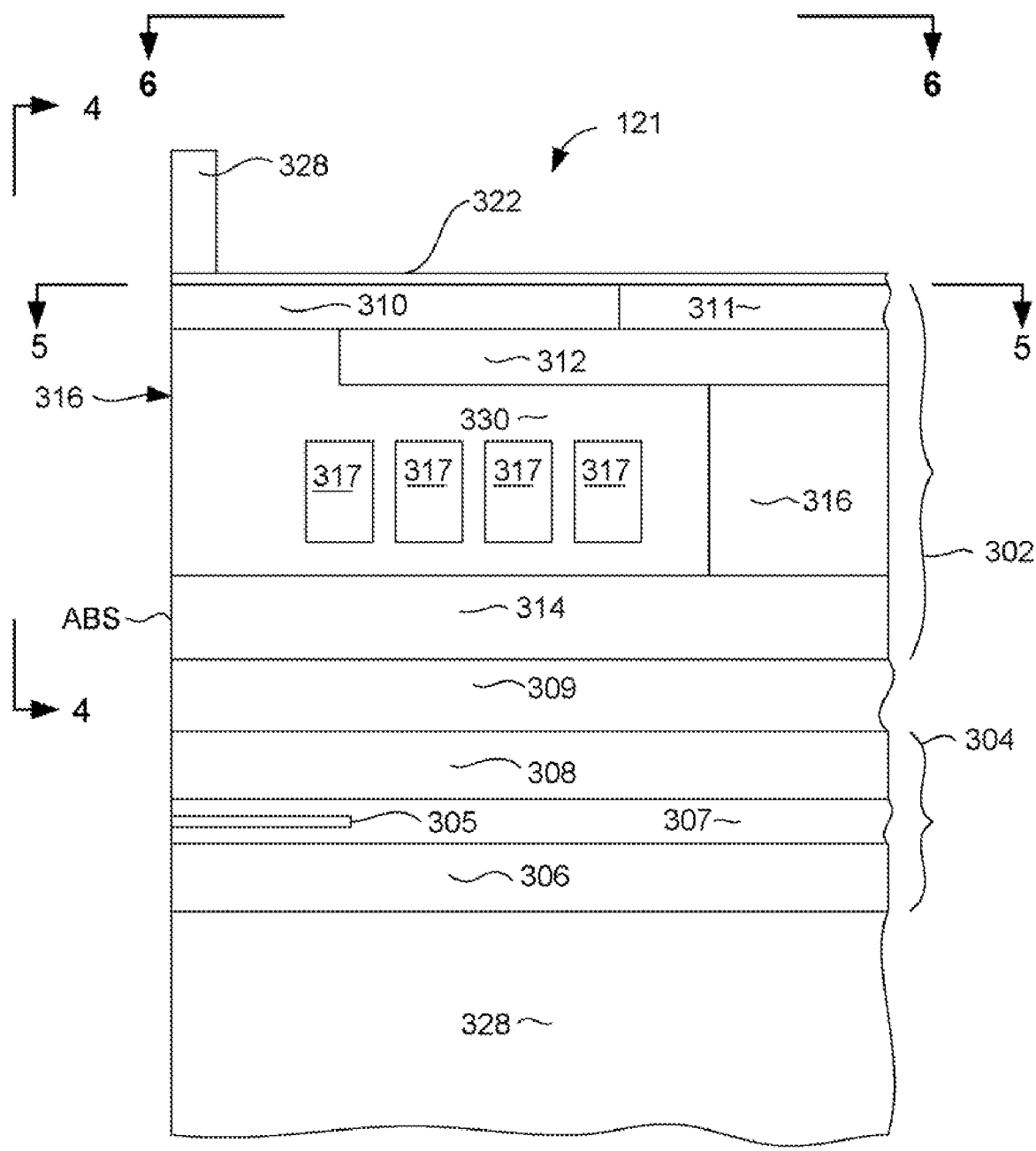
FIG. 3 is a cross sectional view of a magnetic head taken from line 3-3 of FIG. 2, enlarged, and rotated 90 degrees counterclockwise illustrating an embodiment of the invention incorporated into a perpendicular magnetic write head.

With reference now to FIG. 3, the magnetic head 121 for use in a perpendicular magnetic recording system is described. The head 121 includes a write element 302 and a read element 304. The read element 304 includes a magnetoresistive read sensor 305. The sensor 305, could be, for example, a current in plane giant magnetoresistive sensor (CIP GMR), a current perpendicular to plane giant magnetoresistive sensor (CPP GMR) or a tunnel junction sensor (TMR). The sensor 305 is located between first and second magnetic shields 306, 308 and embedded in a dielectric material 307. The magnetic shields 306, 308, which can be constructed of for example CoFe, NiFe or sendust, absorb magnetic fields, such as those from up-track or down-track data signals, ensuring that the read sensor 305 only detects the desired data track located between the shields 306, 308. A non-magnetic, electrically insulating gap layer 309 may be provided between the shield 308 and the write head 302. If the sensor 305 is a CIP GMR sensor, then the sensor will be insulated from the shields 306, 308 as shown in FIG. 3. However, if the sensor 305 is a CPP GMR sensor or TMR sensor, then, the top and bottom of the sensor 305 can contact the shields 306, 308 so that the shields can act as electrically conductive leads for supplying a sense current to the sensor 305.

With continued reference to FIG. 3, the write element 302 includes a write pole 310 that is magnetically connected with a magnetic shaping layer 312, and is embedded within an insulation material 311. The write pole 310 has a small cross section at the air bearing surface and is constructed of a magnetic material. The write head 302 also includes a return pole 314 that is constructed of a magnetic material such as CoFe or NiFe and has a cross section parallel to the ABS surface that is significantly larger than that of write pole 310. The return pole 314 is magnetically connected with the shaping layer 312 and write pole 310 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The coil 317 is embedded in an insulation layer 330 that can be, for example, alumina and can include one or more layers of one or more materials.

The write element 302 can also include a trailing magnetic shield 328 that is separated from the write pole in the trailing direction by a non-magnetic trailing shield gap 322. The trailing shield can be constructed of a magnetic material such as NiFe, CoFe, etc. The trailing shield 328 has a throat height TH that is measured from the air bearing surface (ABS) to its back edge.

When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown). This magnetic field emitted from the write pole 310 magnetizes a relatively higher coercivity, thin top magnetic layer on the magnetic medium (not shown in FIG. 3). This magnetic field travels through a magnetically soft underlayer of the magnetic medium to the return pole 314, where it is sufficiently spread out that it does not erase the signal written by the write pole 310.

Figure 4:
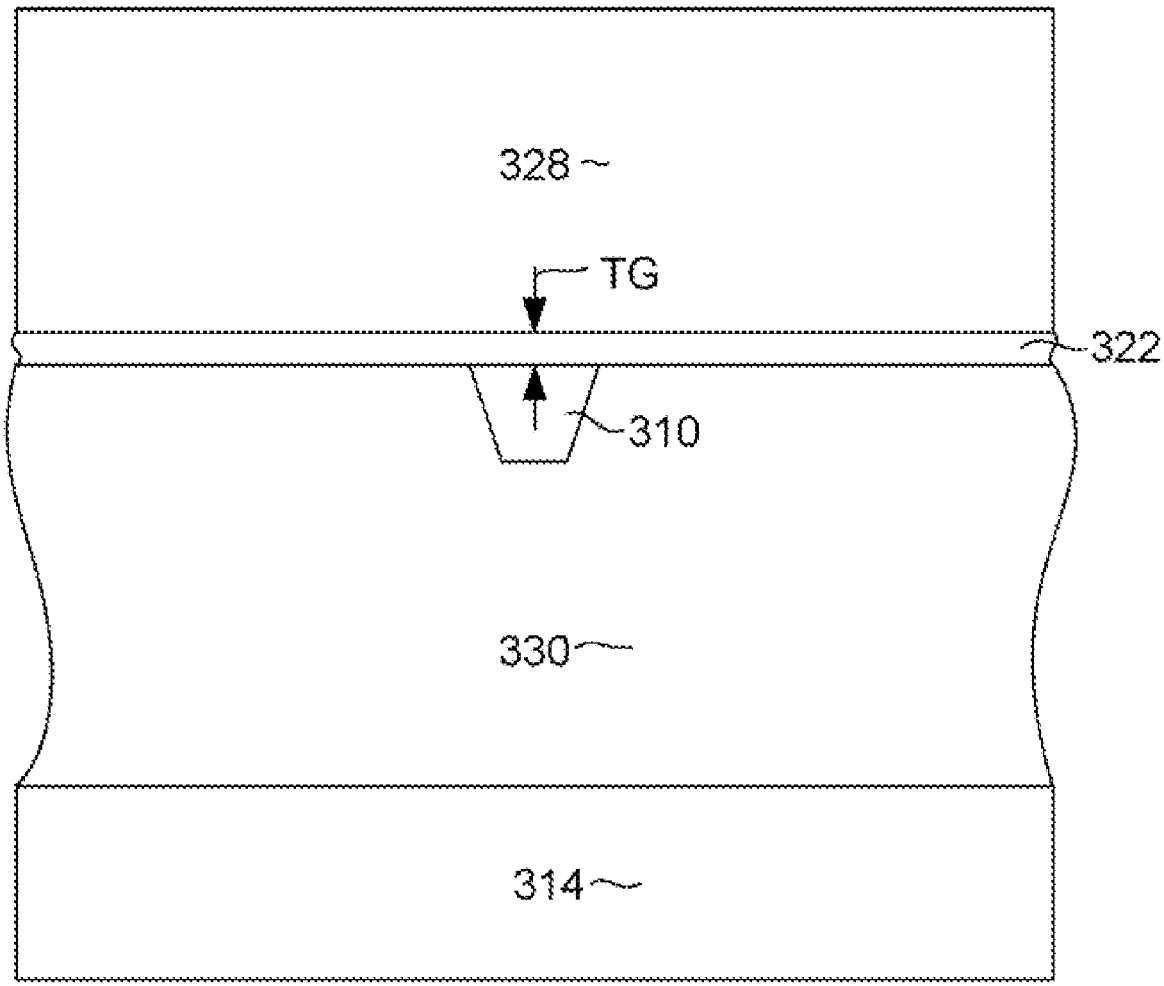
FIG. 4 is an ABS view taken from line 4-4 of FIG. 3 of a write head.

With reference to FIG. 4, which shows an ABS view of the write element 302, it can be seen that the write pole 310 preferably has a trapezoidal shape. This shape helps to reduce skew related adjacent track interference. Although not shown, the trailing shield could be constructed to wrap around the sides of the write pole 310, in which case the side portions of the trailing shield would be separated from the sides of the write pole 310 by a non-magnetic side gap material.

The trailing shield 328 is separated from the write pole 310 by a non-magnetic, trailing gap material 322, which could be one or more layers of non-magnetic material, and is separated from the write pole 310 by a trailing gap distance (TG).

Figure 5:
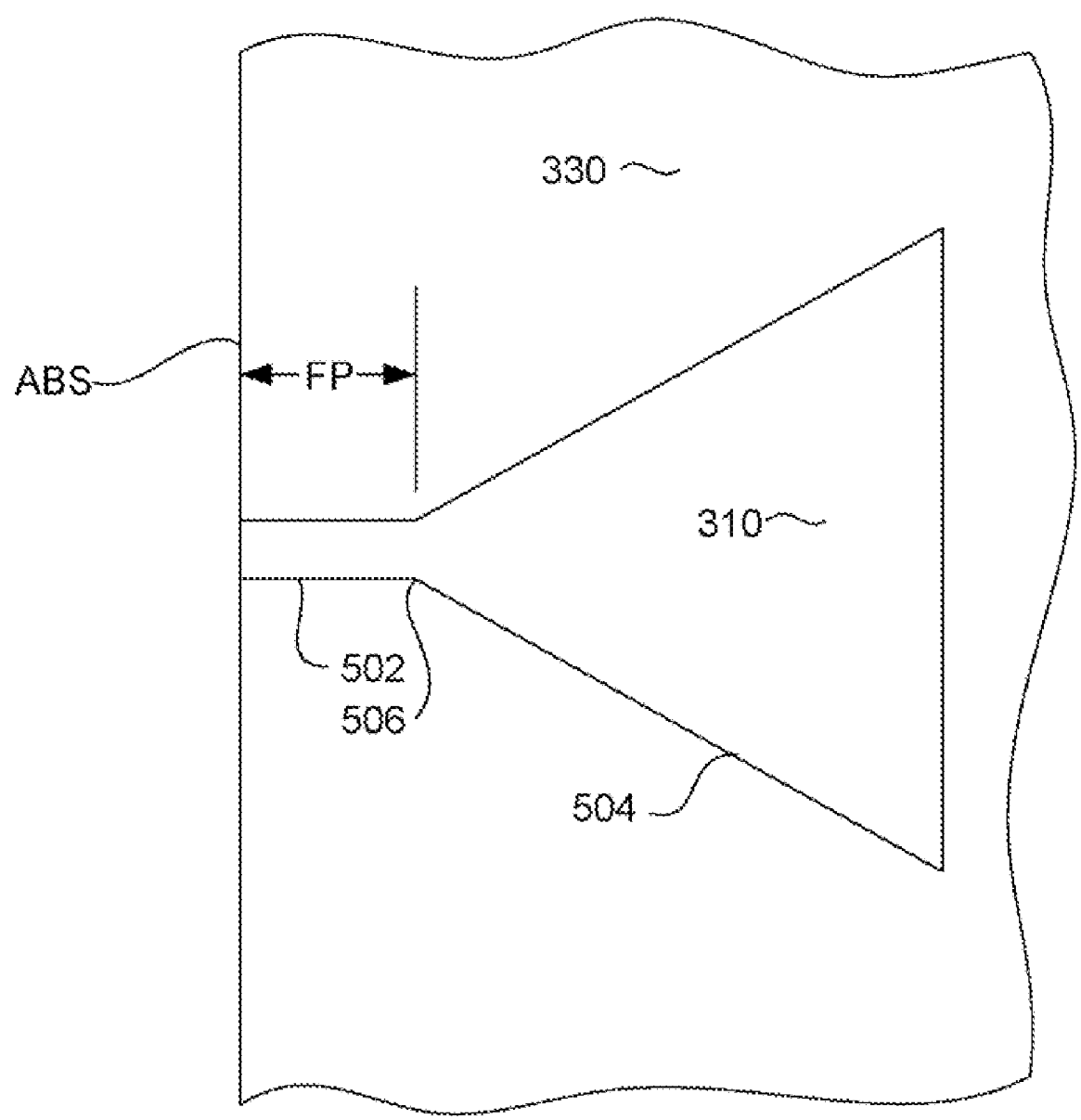
FIG. 5 is a top down view taken from line 5-5 of FIG. 3.
Figure 6:
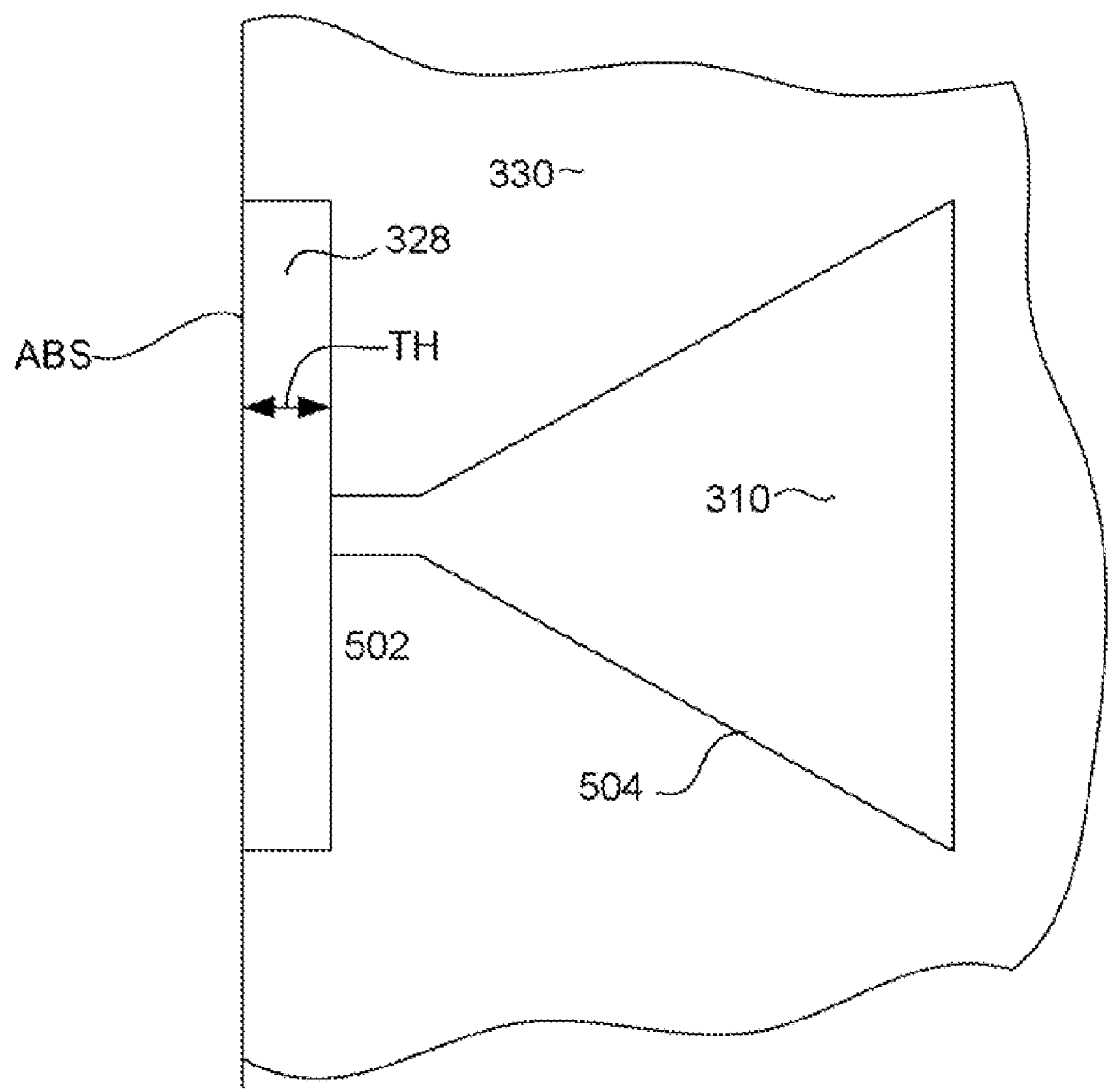
FIG. 6 is a top down view taken from line 6-6 of FIG. 3.

With reference now to FIG. 5, it can be seen that the write pole 310 has a narrow constant width portion 502 and a flared portion 504. The location of the transition between the narrow constant width portion 502 and the flared portion 504 is the flare point 506 and is measured from the ABS as the flare point location (FP). This distance FP is a critical dimension that should be carefully controlled to ensure optimal magnetic performance. With reference now to FIG. 6, it can be seen that the trailing shield 328, which is formed above (ie. trailing) the write pole 310 has a thickness measured from the ABS to a back edge that defines at throat height (TH) of the trailing shield 328.

Figure 7:
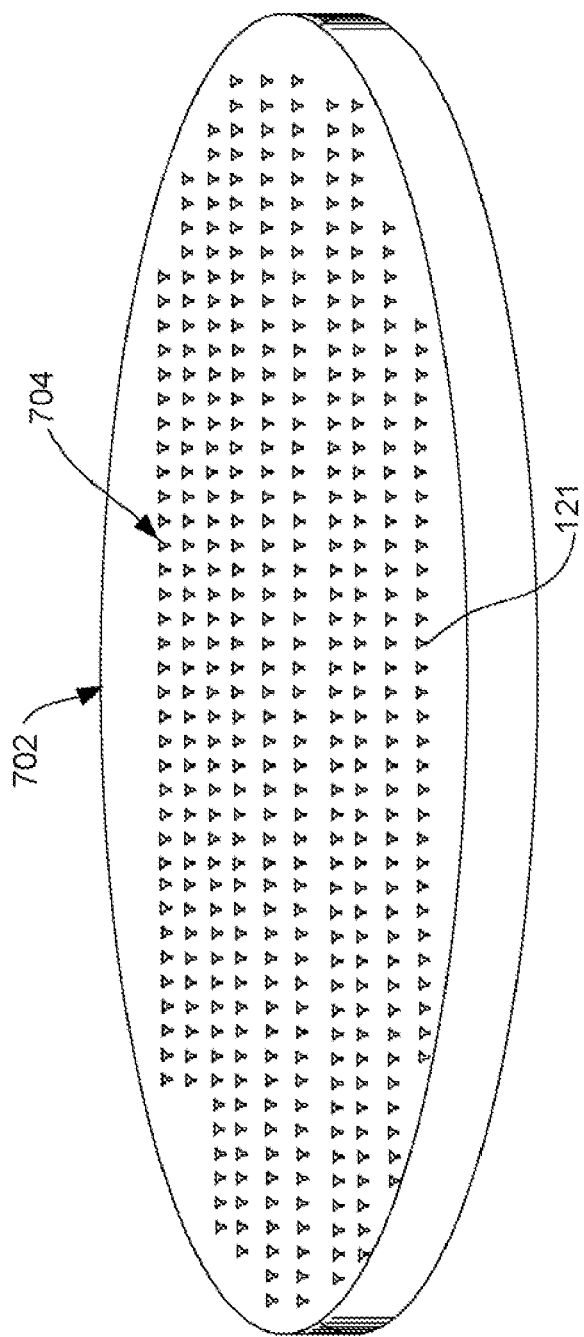
FIG. 7 is a perspective view of a wafer on which a series of rows magnetic heads are constructed.

With reference to FIG. 7, magnetic heads 121 such as those described above are constructed in rows 704 on a wafer 702, with many rows of sliders being manufactured on a single wafer 702. To form the sliders 113 described in FIGS. 1 and 2, the wafer is cut between the rows of heads 121 to form rows of sliders. These rows are then lapped along the cut surface to form an Air Bearing Surface (ABS). After the proper amount of lapping has been performed, the rows of sliders can be cut into individual sliders. The present invention provides a means for accurately monitoring this lapping operation as will be described below.

Figure 8:
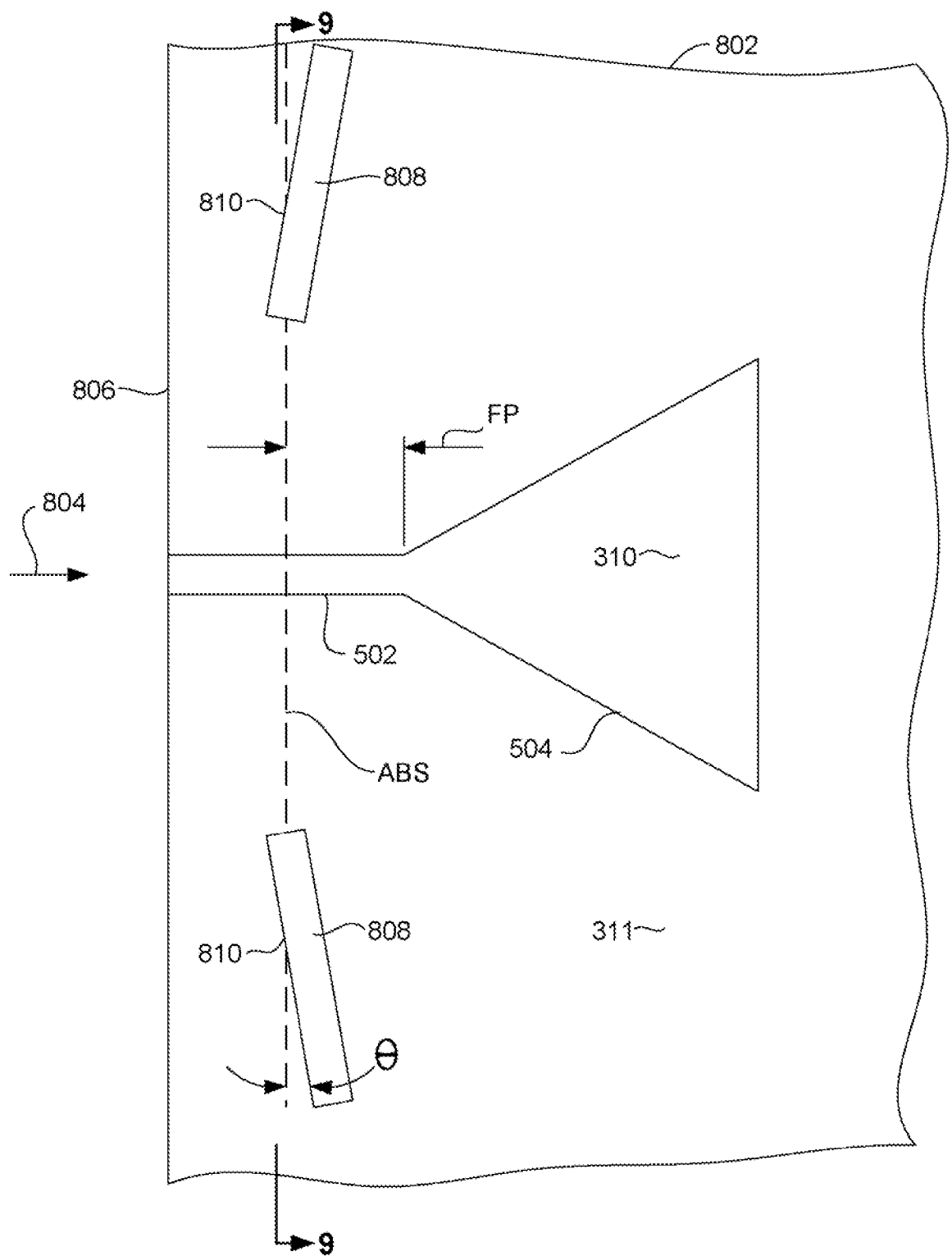
FIG. 8 is a top-down cross sectional view of a portion of a row of sliders cut from the wafer of FIG. 7.

FIG. 8 shows a top down sectional view of a row of sliders 802 cut from a wafer 702 such as that described above. FIG. 8 is a view taken along an elevation that shows the write pole 310. Although only one write pole 310 is shown in FIG. 8, it should be understood that many magnetic heads 121 (FIG. 3) and associated write poles 310 are included on the row 802. As mentioned above, in order to form an Air Bearing Surface (ABS) on the row 802, a lapping process is performed in the direction indicated by arrow 804. This lapping process removes material from the cut edge 806 of the row 802, and is preferably performed until a desired ABS location is reached, the desired ABS location being indicated in FIG. 8 by the dashed line designated ABS.

With reference still to FIG. 8, it can be seen that the slider includes one or more optical lapping guides 808. These optical lapping guides 808 are constructed of a material that is visually distinguishable from the surrounding fill material which is preferably alumina ($Al_2O_3$). The optical lapping guides 808 can be constructed of the same material as the write pole 310, to facilitate manufacturing, although some other material could be used as well. As can be seen, the optical lapping guides 808 each have a front edge 810 that is disposed toward the direction from which lapping progresses (ie. toward the edge 806 of the slider row). This front edge 810 of the lapping guide 808 is tapered with respect to the intended ABS plane and with respect to the edge 806 of the slider row 802. Also as can be seen, a portion of the optical lapping guide 808 extends in front of the ABS plane (toward the edge 806) while a remainder of the optical lapping guide 808 is behind the ABS plane. The front edge 810 of the optical lapping guide 808 defines an acute angle $\theta$ with the intended ABS plane and with the edge 806 of the slider row 802. This angle $\theta$ can be, for example 0.05-0.15 degrees or about 0.1 degrees. The total length of the optical lapping guide 808 can be, for example, 50-150 um or about 100 um.

Figure 9:
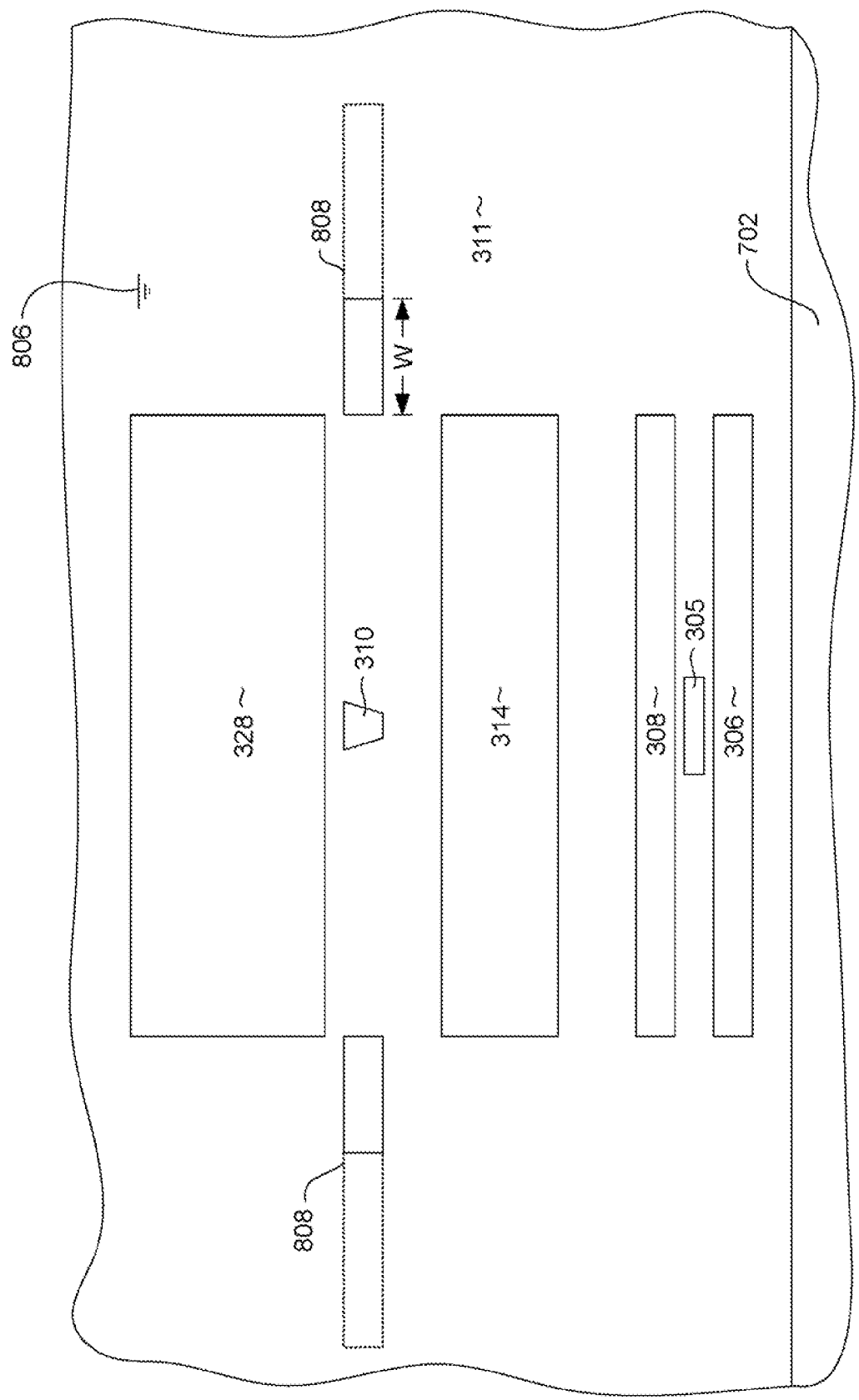
FIG. 9 is a cross sectional view taken from line 9-9 of FIG. 8.

With reference now to FIG. 9, a view taken from section 9-9 of FIG. 8 shows how the edge 806 of the slider row looks as the lapping progresses toward the ABS plane. In FIG. 9, the exposed, visible portion of the lapping guide 808 is shown in solid line, whereas the portion which is still buried behind the fill material 311 is shown in dotted line. As can be seen, as the lapping progresses, a greater portion of the optical lapping guide will be exposed and visible. By measuring the width W of the exposed portion of the optical lapping guide one can very accurately determine the location to which lapping has progressed. In fact, because of the small, acute angle of the front edge of the lapping guide 808 relative to the ABS plane, a small amount of lapping translates into a much larger change in the width W of the exposed portion of the lapping guide. For example, if the front edge 810 of the lapping guide 808 defines an angle 0.1 degrees with the intended ABS plane, a 1 nm change the lapping direction translates into a change of 0.4 um in the exposed optical lapping guide width W.

As can be seen with reference to FIG. 9, the optical lapping guide 808 can be constructed at the same build elevation as the write pole 310. This means that the optical lapping guide 808 can advantageously be formed in the same photolithographic patterning step as the write pole 310. This means that the lapping guide 808 does not have to be formed in a separate photo step which would then have to be aligned separately aligned with the write pole 310. Therefore, the location of the lapping guide 808 relative to the write pole 310 can be extremely accurately controlled.

As mentioned above, the amount of lapping progression can be determined by measuring the amount of the lapping guide 808 that is visible. This can be done by performing an optical/SEM inspection of the ABS surface. While this inspection would not be performed during the actual lapping process, it could be performed intermittently. In addition, the inspection process allows an operator to grade (ie. bin) the sliders and provides a feedback for optimization of the lapping process.

Figure 10:
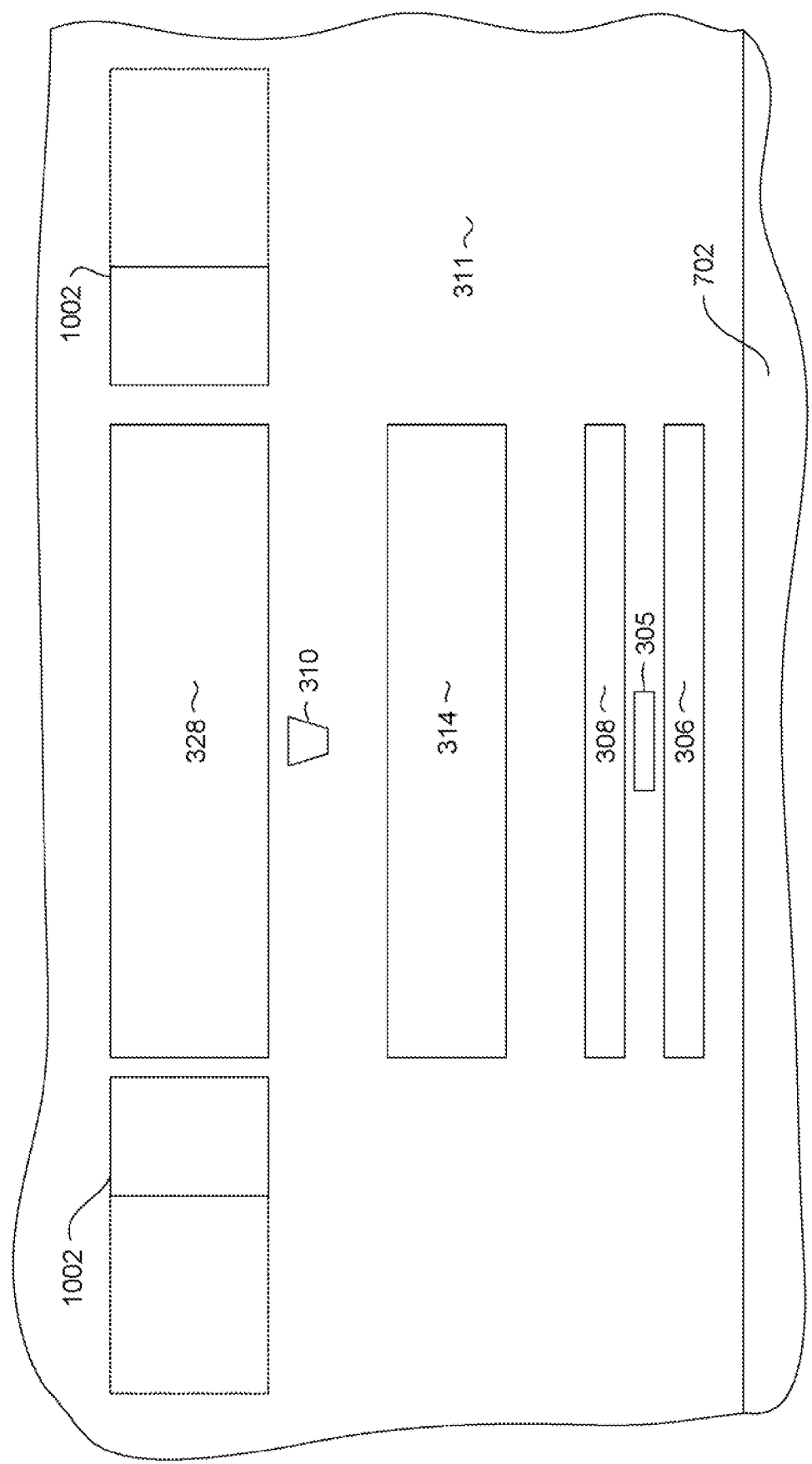
FIG. 10 is a cross sectional view similar to that of FIG. 9.

FIG. 9 showed that the lapping guide 808 can be formed at the same elevation as the write pole 310. With reference now to FIG. 10, an optical lapping guide 1002 can be provided that is formed in the same elevation plane as the trailing shield 328. This optical lapping guide 1002 can be used to very accurately control the trailing shield throat height by giving an indication of how much trailing shield material 328 has been removed by the lapping process. Since the optical lapping guide 1002 is at the same build elevational as the trailing shield, it can be formed in the same lithographic step as the trailing shield 328, allowing the optical lapping guide 1002 to be very accurately aligned relative to the trailing shield 328 (more specifically, relative to the back edge of the trailing shield opposite the ABS). The optical lapping guide 1002 can be used in conjunction with or in addition to the lapping guide 808 described with reference to FIG. 9. The lapping guide 1002 can have a front edge that defines an acute angle relative to the ABS plane as described above with reference to the lapping guide 808.

Figure 11:
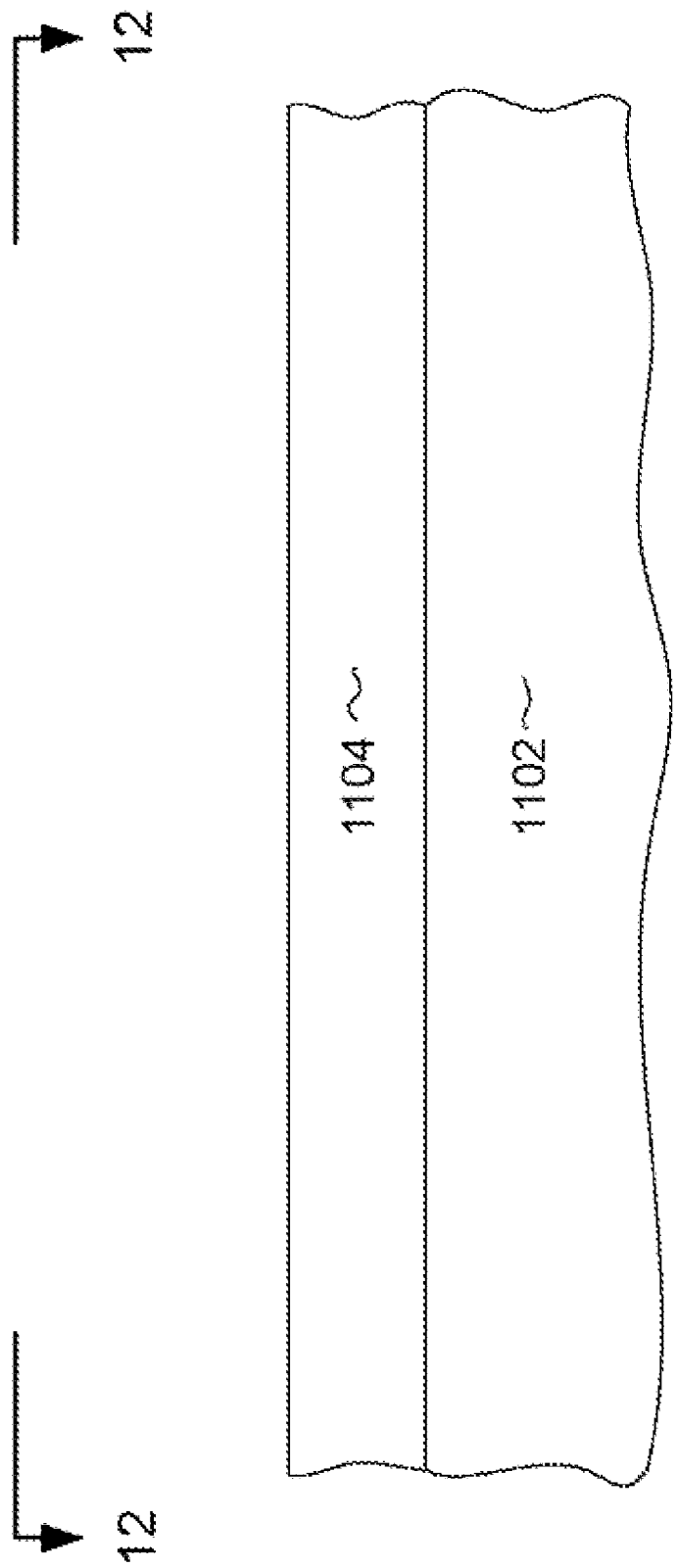
FIG. 11 is a cross sectional view illustrating a method of forming an optical lapping guide in a slider.
Figure 12:
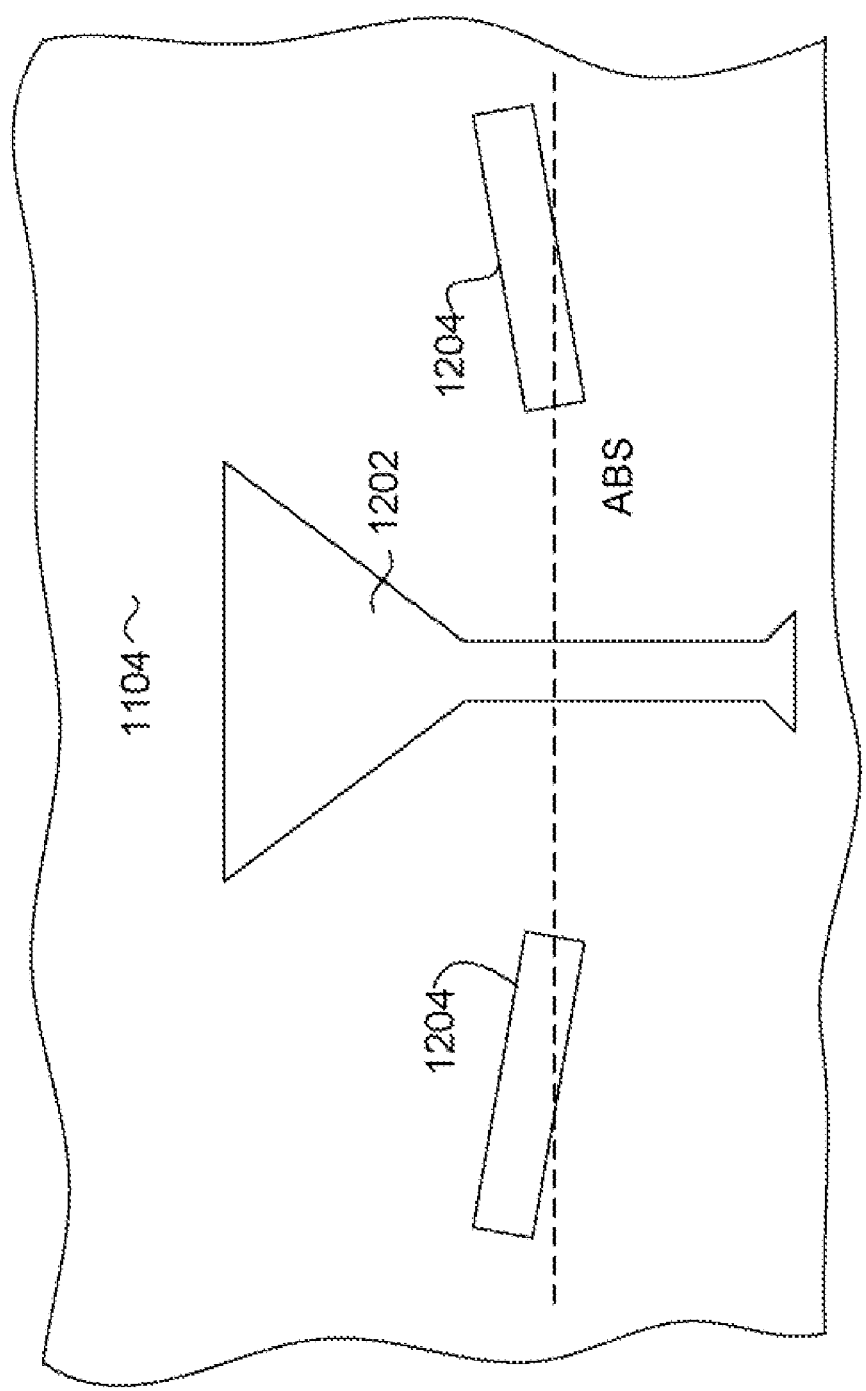
FIG. 12 is a view taken from line 12-12 of FIG. 11

With reference now to FIG. 11, a method for forming optical lapping guides 808 (FIG. 9) or 1002 (FIG. 10) is described, although other methods for forming an optical lapping guide 808 may be possible as well. With this in mind, in order to construct an optical lapping guide, a substrate 1102 is provided. This substrate 1102 may be an electrically insulating non-magnetic fill material such as alumina and may also include the shaping layer 312 described with reference to FIG. 3. A layer of masking material such as photoresist or thermal image resist (TIS) 1104 can be deposited over the substrate. With reference now to FIG. 12, the mask 1104 is lithographically patterned and developed to form it with openings 1202, 1204. The opening 1202 is configured to define a write pole 310 as described with referenced to FIGS. 3 and 4. The openings 1204 are configured to define the lapping guides 808 described in FIGS. 8 and 9. The openings 1202 and 1204 are preferably defined in a single common lithographic process, as mentioned above. With the openings 1202, 1204 defined, a magnetic write pole material is deposited into the opening 1202 to form the write pole. This material may be a lamination of magnetic layers such as CoFe or NiFe separated by thin non-magnetic layers. This same material can also be deposited into the openings 1204 to form the optical lapping guides. Once the write pole and lapping guides have been formed by the deposition of magnetic material, the mask material 1104 can be lifted off. Although the above process has been described in terms of constructing an optical lapping guide 808 that is formed in the same lithographic step as the write pole 310, a similar method can be used to construct an optical lapping guide 1002 that is formed in the same lithographic step as the trailing shield 328. In that case, after forming the write pole 310, a non-magnetic trailing gap material is deposited. A mask material can then be deposited and patterned to form the mask with first and second openings. The first opening can be configured to define the trailing shield, and the second opening can be configured to define the optical lapping guide. A magnetic material can then be deposited into the openings to form the trailing shield 328 and lapping guide 1002.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a slider for magnetic recording comprising:
    providing a wafer;
    forming a write head on the wafer;
    determining an ABS plane, the ABS plane being located relative to the write head; and
    forming an optical lapping guide on the wafer, the optical lapping guide having a front edge a first portion of which is on a first side of the ABS plane and a second portion of which is on a second side of the ABS plane.

2. A method as in claim 1 wherein the front edge of the optical lapping guide defines an acute angle with respect to the ABS plane.

3. A method as in claim 1 wherein the front edge of the optical lapping guide defines an angle of 0.05 to 0.15 degrees with respect to the ABS plane.

4. A method as in claim 1 wherein the front edge of the optical lapping guide defines an angle of about 0.1 degrees with respect to the ABS plane.

5. A method as in claim 1, further comprising, after forming the optical lapping guide, performing a lapping operation and then optically inspecting the optical lapping guide to determine a progress of the lapping operation.

6. A method as in claim 1, further comprising, after forming the optical lapping guide, performing a lapping operation and then optically inspecting the optical lapping guide by SEM to determine a progress of the lapping operation.

7. A method as in claim 1, wherein the optical lapping guide and the write pole are defined in a common lithographic step.

8. A method as in claim 1, further comprising after forming a write pole, forming a trailing magnetic shield, and wherein the optical lapping guide and the trailing shield are defined in a common lithographic step.

9. A method as in claim 1 wherein the optical lapping guide comprises a magnetic material.

* * * * *